US008288037B2

(12) United States Patent
Isaacson et al.

(10) Patent No.: US 8,288,037 B2
(45) Date of Patent: Oct. 16, 2012

(54) SAFE RESERVE ACTIVATED LITHIUM ION BATTERY

(75) Inventors: Mark J. Isaacson, Santa Clara, CA (US); Bogdan A. Bude, Sunnyvale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 897 days.

(21) Appl. No.: 12/263,365

(22) Filed: Oct. 31, 2008

(65) Prior Publication Data

US 2009/0117460 A1 May 7, 2009

Related U.S. Application Data

(60) Provisional application No. 60/984,680, filed on Nov. 1, 2007.

(51) Int. Cl.
*H01M 6/04* (2006.01)
*H01M 2/08* (2006.01)

(52) U.S. Cl. ........................................ 429/188; 429/185

(58) Field of Classification Search ........... 429/185–188
See application file for complete search history.

(56) References Cited

U.S. PATENT DOCUMENTS 4,148,974 A 4/1979 Eppley
4,950,565 A * 8/1990 Schisselbauer et al. ...... 429/116
2005/0042515 A1 2/2005 Hwang et al.
2006/0003232 A1* 1/2006 Jung et al. ..................... 429/330
2006/0099509 A1 5/2006 Ishii et al.
2006/0166093 A1 7/2006 Zaghib et al.
2007/0196732 A1* 8/2007 Tatebayashi et al. ......... 429/181
2008/0199764 A1 8/2008 Holman et al.

* cited by examiner

*Primary Examiner* — Karie O'Neill Apicella

(74) *Attorney, Agent, or Firm* — McDermott Will & Emery LLP

(57) ABSTRACT

A reserve activated lithium ion battery is provided with a number of safety features designed to prevent a thermal run-away condition. The reserve activated battery may include a non-flammable electrolyte, a phosphate-based cathode, an anode with a non-fluorinated binder, and/or a solid electrolyte interface on the anode.

3 Claims, 2 Drawing Sheets

205

SAFE RESERVE ACTIVATED LITHIUM ION BATTERY

RELATED APPLICATION

The present application claims the benefit of priority under 35 U.S.C. §119 from U.S. Provisional Patent Application Ser. No. 60/984,680, entitled "SAFE RESERVE ACTIVATED LITHIUM ION BATTERY," filed on Nov. 1, 2007, which is hereby incorporated by reference in its entirety for all purposes.

FIELD OF THE INVENTION

The present invention generally relates to batteries and, in particular, relates to safe reserve activated lithium ion batteries.

BACKGROUND OF THE INVENTION

Reserve activated batteries are configured such that the electrolyte is not provided until the battery is called upon to provide power. Many reserve activated batteries are vulnerable to a variety of exothermic reactions when overcharged or exposed to excess heat. These reactions can cause a thermal run-away condition, which can damage or even destroy the battery.

SUMMARY OF THE INVENTION

The present invention solves the foregoing problems by providing a reserve activated lithium ion battery with a number of safety features designed to prevent a thermal run-away condition. The reserve activated battery may include a non-flammable electrolyte, a phosphate-based cathode, an anode with a non-fluorinated binder, and/or a solid electrolyte interface on the anode.

In one aspect of the present invention, a battery comprises a non-flammable electrolyte, which reduces the risk of damage to or failure of the battery in a high temperature environment.

In another aspect, a battery comprises an anode having a non-fluorinated binder. In this aspect, the non-fluorinated binder may be used to bind an active layer (e.g., meso-carbon micro-beads) of the anode. By providing a fluoride-free anode, heat generated by a reaction between fluorine and lithium is avoided.

In a further another aspect, a battery comprises a phosphate-based cathode, which is more resistant to decomposition when overcharged compared with cobalt-or nickel-based cathodes.

In yet another aspect, a battery comprises an anode having a solid electrolyte interface, which protects the anode from corrosion by an electrolyte.

BRIEF DESCRIPTION OF THE DRAWINGS

The accompanying drawings, which are included to provide further understanding of the invention and are incorporated in and constitute a part of this specification, illustrate aspects of the invention and together with the description serve to explain the principles of the invention.

DETAILED DESCRIPTION OF THE INVENTION

Figure 1:
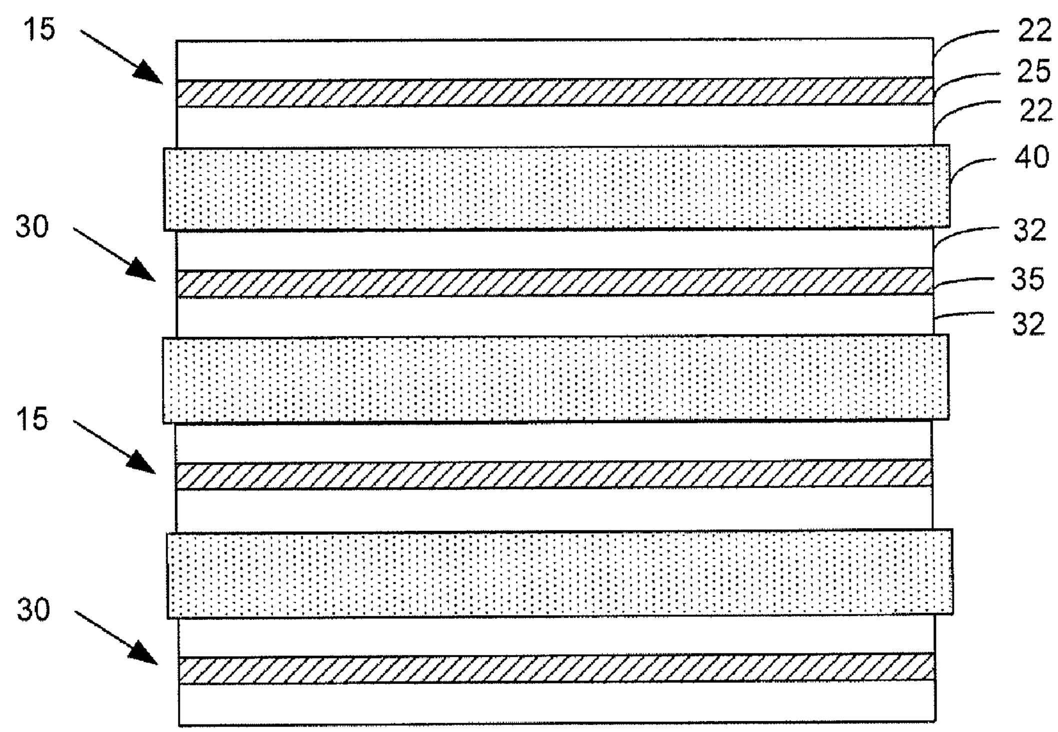
FIG. 1 illustrates an example of a stacked electrodes in a battery in accordance with one aspect of the invention.

According to one aspect of the present invention, a reserve activated lithium ion battery is provided with a non-flammable electrolyte to reduce the risk of damage or failure in a high temperature environment that can occur with flammable (e.g., solvent) electrolytes used in other lithium ion batteries.

According to another aspect of the present invention, a reserve activated lithium ion battery is provided with an anode having a non-fluorinated (e.g., other than polyvinylidene difluoride) binder. By providing a fluorine-free anode, the heat generated by a reaction between fluorine and intercalated lithium, which occurs in other lithium ion batteries with fluorinated anodes, is avoided.

In one aspect, the non-fluorinated binder comprises one or more polymeric materials. The polymeric materials may include styrene butadiene rubber ("SBR") and carboxy methyl cellulose ("CMC"). The non-fluorinated binder may be used to bind the active material of the anode. The active material may comprise meso-carbon micro-beads ("MCMB") and/or other materials. Suitable MCMBs are commercially available, e.g., from Osaka Gas Chemicals Co., Ltd. The MCMB may comprise conductive carbon in the form of nano-sized carbon black particles.

In one aspect, the anode may be formed by producing a slurry of the active material and the non-fluorinated binder dissolved in water. The slurry may then be coated on a conductor of the anode (e.g., copper foil), and the water in the slurry removed in an oven. The resulting anode may then be calendered (e.g., machine pressed) to a desired thickness.

In one aspect, the non-fluorinated binder in the slurry may comprise both SBR and CMC. In this aspect, the weight ratio of the active material, the SBR and the CMC may be approximately 92:4:4, respectively. In another aspect, the non-fluorinated binder in the slurry may comprise SBR without CMC. In this aspect, the weight ratio of the active material and the SBR may be approximately 92:8. In a further aspect, the non-fluorinated binder in the slurry may comprise CMC without SBR. In this aspect, the weight ratio of the active material and the CMC may be approximately 92:8.

In one aspect, the non-fluorinated binder may comprises polyethylene ("PE"), polypropylene ("PP"), other poly-olefins, or a combination thereof. In this aspect, the binder may be dry mixed with the active material using a mixer device and then coated on the conductor (e.g., copper foil) to form the anode. In this aspect, the weight ratio of the active material and the binder in the mixture may be 92:8.

In accordance with yet another aspect of the present invention, a reserve activated lithium ion battery is provided with a phosphate-based cathode. A phosphate-based cathode is more resistant to decomposition when overcharged than cobalt-or nickel-based cathodes used in other lithium ion batteries. Accordingly, when a battery with such a phosphate-based cathode is overcharged, it will not undergo an exothermic reaction that might lead to a thermal run-away condition.

In one aspect, the phosphate-based cathode comprises a discharged form of lithium iron phosphate ($LiFePO_4$), a charged form of iron phosphate ($FePO_4$), vanadium phosphate, other phosphate materials, or a combination thereof.

According to certain aspects of the present invention, a reserve activated lithium ion battery is provided with an anode having a solid electrolyte interface ("SEI") layer that is not soluble in the electrolyte at high temperature. This layer protects the anode from corrosion by the electrolyte, and thereby eliminates the heat associated with the reaction of intercalated lithium with an electrolyte solvent.

In one aspect, the SEI layer comprises an inorganic or organic material deposited on the active material of the anode (e.g., MCMB). The SEI layer is an electrical insulator that conducts lithium ions between the electrolyte and the active material. The SEI layer is also mutually insoluble in with the electrolyte solvents at room temperature and elevated temperatures.

Examples of inorganic materials that may be used for the SEI layer include $Li_2$—$SiS_2$—$Li_4SiO_4$ and $Li_3N$. An inorganic material may be deposited on the active material by a vacuum vapor deposition process.

Examples of organic materials include polyethylene glycol, dimethylmethacrylate and derivatives of these materials. An inorganic material may be deposited on the active material (e.g., MCMB) by a solvent coating process, in which the inorganic material is dissolved in a solvent. The active material of the anode is then immersed in the dissolved inorganic material, and the solvent is evaporated leaving an organic coating on the active material.

The SEI layer may also comprise a lithium ion conductor that is deposited on the active material as a monomer precursor, and then cured on the active material, e.g., by heat, ultraviolet light, or e-beam. An example of such a lithium ion conductor is poly(ethylene glycol dimethyl acrylate) ("PEGDMA").

FIG. 1 shows an example of stacked electrodes 10 for a battery that may incorporate safety features according to embodiments of the present invention. The stacked electrodes 10 comprise a plurality of anodes 15 and cathodes 30 arranged in an alternating fashion as shown in FIG. 1. The stacked electrodes 10 also comprise a plurality of separators 40 disposed between the anodes 15 and the cathodes 30. The separators 40 may be made of a porous material into which electrolyte can flow between the anodes 15 and the cathodes 30. The electrolyte may comprise lithium salt in a non-flammable solvent to reduce the risk of damage or failure in a high temperature environment.

The separators 40 may extend slightly beyond the edges of the anodes 15 and cathodes 30 as shown in FIG. 1 to prevent the edges of the anodes 15 and cathodes 30 from contacting one another due to bending. Although two pairs of anodes 15 and cathodes 30 are shown in the FIG. 1, the stacked electrodes 10 may have any number of anodes and cathodes.

Each anode 15 comprises a conductor 25 (e.g., copper foil) surrounded by an active layer 22. The active layer 22 may comprise an active material and a non-fluorinated binder to bind the active material together. For example, the active material may comprise active particles (e.g., meso-carbon micro-beads) bound together by the non-fluorinated binder. As discussed above, using a non-fluorinated binder prevents heat generated by a reaction between fluorine and intercalated lithium, which occurs in other lithium ion batteries with fluorinated anodes. A solid electrolyte interface ("SEI") layer may be coated on the surfaces of the active particles (e.g., meso-carbon micro-beads) to protect them from corrosion by the electrolyte. The conductor 25 conducts electrical current between the anode 15 and a negative terminal (not shown) of the battery.

Each cathode 30 comprises a conductor 35 (e.g., aluminum foil) surrounded by an active layer 32. The active layer 32 may comprise a phosphate material such as lithium iron phosphate ($LiFePO_4$), iron phosphate ($FePO_4$), vanadium phosphate, other phosphate materials, or a combination thereof. As discussed above, a phosphate-based cathode is more resistant to decomposition when overcharged than cobalt-or nickel-based cathodes used in other lithium ion batteries. The conductor 35 conducts electrical current between the cathode 30 and a positive terminal (not shown) of the battery.

To supply power in a charged state, the conductor 25 conducts electrons released from lithium ions in the active layer 22 of the anode 15 to the negative terminal of the battery. After releasing electrons, the lithium ions are extracted from the anode 15 and transported by the electrolyte in the porous separator 40 from the anode 15 to the cathode 30. The lithium ions are then intercalated into the active layer 32 of the cathode 30 where the lithium ions combine with electrons from the conductor 35 of the cathode 30, which conducts electrons from the positive terminal of the battery to the cathode 30. To power an external device, electrons from the anode 15 conduct through the external device and back to the cathode 30 of the battery.

Figure 2:
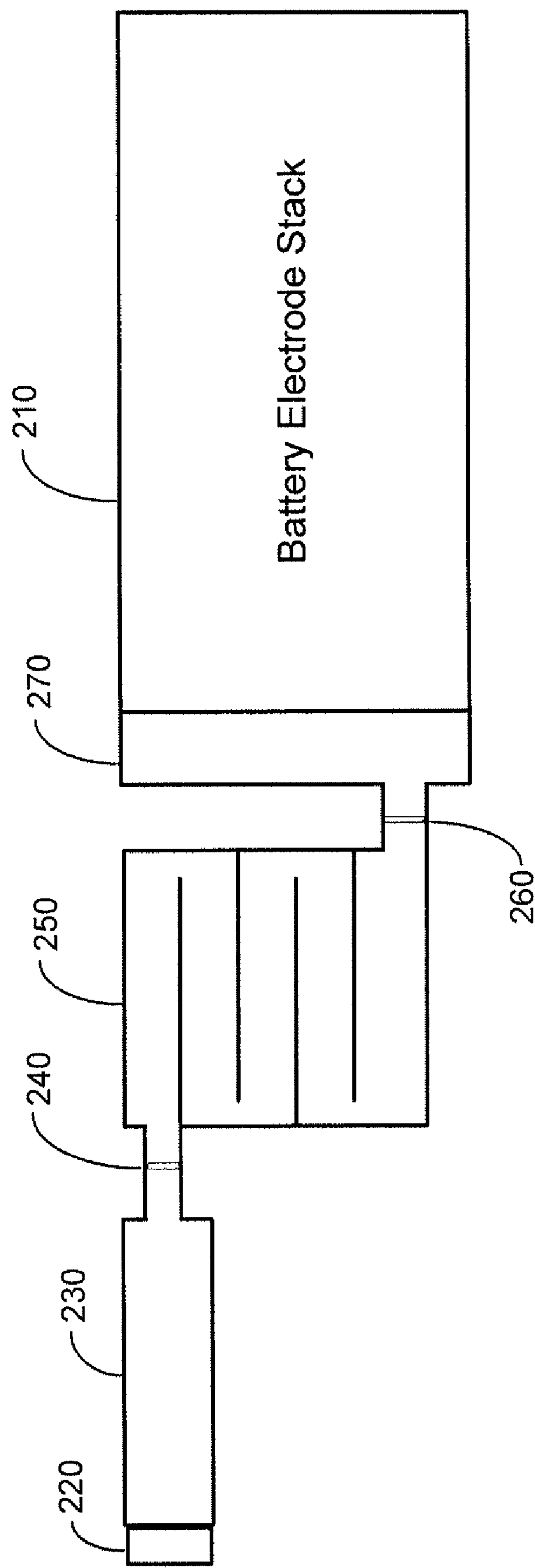
FIG. 2 illustrates an example of a reserve activated battery in accordance with one aspect of the invention.

FIG. 2 shows an example of a reserve activated lithium battery 205 that may incorporate safety features according to embodiments of the present invention. The reserve activated lithium battery 205 comprises an electrical explosive device 220, a gas generator 230, an electrolyte reservoir 250, a manifold 270, and stacked electrodes 210, which may be similar to the configuration shown in FIG. 1 and incorporate safety features according to embodiments of the invention. The electrolyte reservoir 250 stores electrolyte until the reserve activated lithium battery 205 is called upon to provide power. The electrolyte reservoir 250 may be in the shape of a coil as shown in FIG. 3 or other shape. The reserve activated lithium battery 205 also comprises a first diaphragm 240 between the gas generator 230 and the electrolyte reservoir 250, and a second diaphragm 260 between the electrolyte reservoir 250 and the manifold 270.

To activate the reserve activated lithium battery 205, the electrical explosive device 220 is activated, which ignites a gas-generating material in the gas generator 230 causing the gas-generating material to generate gas. Pressure from the generated gas causes the first diaphragm 240 to burst allowing the gas to expand into the electrolyte reservoir 250. The gas builds up pressure in the electrolyte reservoir 240, which eventually causes the second diaphragm 260 to burst allowing the electrolyte in the electrolyte reservoir 250 to enter the manifold 270. The manifold 270 evenly distributes the electrolyte from the electrolyte reservoir 250 to the stacked electrodes 210, and may comprise a network of pipes (not shown). Other mechanisms (e.g., pump) may be used to release electrolyte from the reservoir besides expanding gas. After the electrolyte is distributed to the stacked electrodes 210, the reserve activated lithium battery 205 is activated and able to provide power to external devices.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A battery, comprising:

an anode comprising an active layer having a non-fluorinated binder;

a phosphate-based cathode separated from the anode;

an electrolyte reservoir having a first opening and a second opening;

electrolyte stored in the electrolyte reservoir;

a first diaphragm sealing the first opening of the electrolyte reservoir;

a second diaphragm sealing the second opening of the electrolyte reservoir; and a gas generator configured to generate gas that bursts open the first diaphragm, expands into the electrolyte reservoir through the first opening and build ups sufficient pressure in the electrolyte reservoir to burst open the second diaphragm, allowing the electrolyte to flow between the anode and cathode through the second opening.

2. The battery of claim 1, further comprising a porous separator disposed between the anode and the cathode.

3. The battery of claim 1, wherein the electrolyte comprises a lithium salt in a non-flammable solvent.

* * * * *